Nov. 18, 1930.　　　　C. B. MILLS　　　　1,782,048
GYROCOMPASS REVERSING CONTACT
Original Filed March 15, 1921
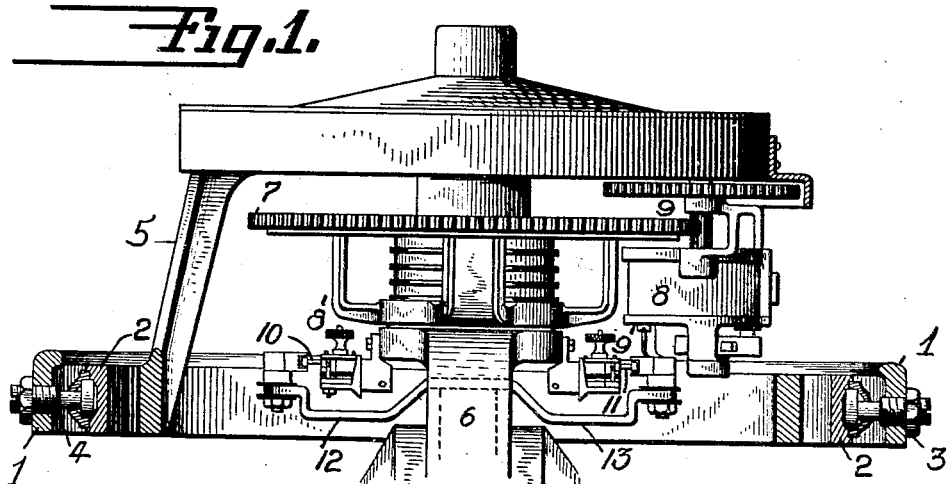
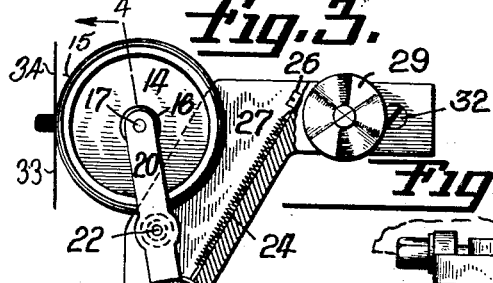
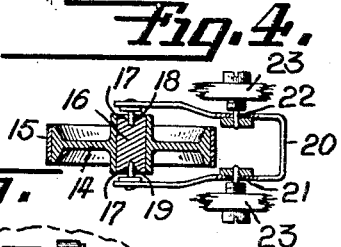
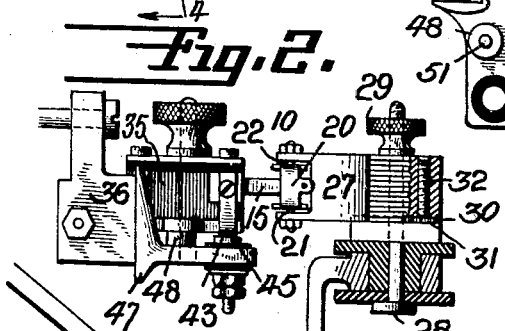
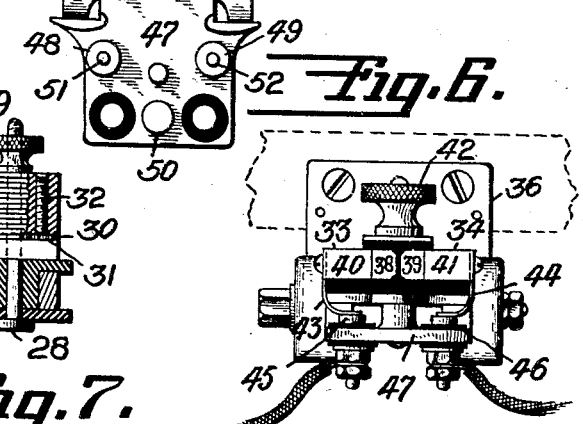
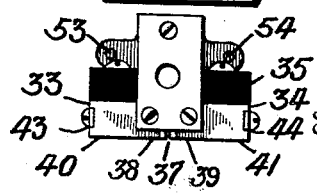
Inventor
Chester B. Mills
By his Attorney
Herbert H. Thompson Patented Nov. 18, 1930

1,782,048

UNITED STATES PATENT OFFICE

CHESTER B. MILLS, OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

GYROCOMPASS REVERSING CONTACT

Original application filed March 15, 1921, Serial No. 452,505. Divided and this application filed December 27, 1922. Serial No. 609,329.

This invention has reference to gyro-compass reversing contacts and has for its object the provision of an improved device of the character which is simple and rugged in construction and at the same time thoroughly reliable and efficient. The present application is a division of my pending application Serial No. 452,505, filed March 15, 1921, which division is made at the requirement of the U. S. Patent Office, under the provisions of rule 42.

My invention will be better understood from the following description taken in connection with the accompanying drawings, and its scope will be pointed out in the appended claims.

In the drawings, illustrating what I now consider the preferred form of my invention, Fig. 1 is a side elevation, partly in section, of the upper portion of a gyro-compass and its mounting, showing the location of my improved contacts, Fig. 2 is a side elevation of the trolley or contact wheel and cooperating contact block, Fig. 3 is a detailed top view of the trolley wheel mounted on a follow-up member, Fig. 4 is a sectional view of the trolley wheel taken on the line 4—4 of Fig. 3, Fig. 5 is a top view of the bracket supporting the contact block, Fig. 6 is a front elevation of the contacts on the follow-up system, and Fig. 7 is a top view of the contact block detached.

Referring now to the drawings, the numeral 1 indicates the gimbal ring which supports the compass proper. The second ring 2 is supported on horizontal pivots 3, 4, within the ring 1, said second ring in turn supporting, on horizontal pivots, at right angles to the pivots 3, 4, not shown, the main framework of the compass, a part of which is shown in Fig. 1, marked 5. The main frame supports the frame 6 of the follow-up system, which has secured thereto the usual large gear 7, which is driven by a reversible motor 8 operating through reduction gears 9. As the particular arrangement and construction of the compass proper forms no part of the present invention, the same being fully described in my parent case, numerous parts have been omitted, and it is believed that the foregoing brief description of the compass proper is sufficient for the purpose herein. Those familiar with the art understand that the gyrocompass includes a rotor and a repeater system.

For driving the rotor, the repeater system and the follow-up system, I prefer to employ the same line voltage (65–70 volts), so that no auxiliary machinery need be employed, and the number of wires entering the compass reduced to a minimum, thereby reducing the number of slip rings on the compass. Heretofore, it has been the practice to employ 90 volts A. C. for the rotor and 20 volts D. C. for the follow-up, and repeater systems. To handle the higher voltage employed in my follow-up system, I have devised improved reversing contacts for the follow-up frame. A pair of reversing contacts are secured to each side of the frame 6 at 8', 9', while cooperating trolleys 10, 11 are respectively secured to oppositely extending arms 12, 13 of the vertical ring, as shown in detail in Figs. 2 to 7. As shown in Fig. 4, the trolley wheel is composed of a small wheel 14, preferably of aluminum to reduce weight, and a rim 15 of gold, platinum, platinum iridium, or similar metal. The hub thereof is provided with an inserted metal bearing block 16 of special characteristics, each end of the bearing pin being provided with a counter bore 17. Taking in said bores are a pair of small pins 18, 19, extending oppositely from spring-fork 20, pivoted at 21, 22, to block 23, best shown in Fig. 2. Pressure of the trolley is supplied by a spring 24, shown in Fig. 3 extending between arm 25 of the spring fork 20 and a pin 26 on bracket 27. Since the bearings of the trolley cannot be lubricated without interposing resistance in the circuit, I prefer to employ two metals for the pins and bearing points, having low coefficients of friction, without sacrificing wearing qualities. I have found German silver an excellent metal for the block 16 when used in connection with the Monel metal pins 18, 19. Bracket 27 is detachably clamped to arm 12 or 13, as by means of bolt 28 and nut 29, a tongue and groove connection 30 being provided between said bracket and base 31 so that the trolley will also be properly aligned. A set screw 32 may also be provided for adjusting the trolley in a vertical plane. It is of course understood that trolleys 10, 11 are identical. Two sets are provided to keep the apparatus in operation, if one should fail to function, for any reason, or to permit the removal of one for replacement of parts, or cleaning the same without disturbing the operation.

The contact blocks proper, indicated at 8', 9', in Fig. 1, which cooperate with trolleys 11, 12, respectively, each comprise a pair of spaced blocks 33, 34 of metal mounted in a block of insulation 35 adjustably and detachably clamped to a bracket 36, see Figs. 5 to 7. The blocks preferably have a base of a baser metal, but adjacent the insulating space 37, I prefer to insert strips of pure tungsten 38, 39, or like metal such as molybdenum, so that the break occurs on tungsten to gold, or a similar metal. Remarkable results have been obtained with this combination, the remarkable conductivity, comparative softness, smoothness and ductility of gold, platinum, platinum iridium, and the like, complementing and cooperating with the harder, tougher and high resistance tungsten to produce a make and break contact of exceptional wearing qualities. With low voltage, gold is preferably employed, but with high voltage, I employ platinum iridium, since it has a higher fusing point. Such a contact has especial adaptation to compass work, since in this type of compass wherein a continuous "hunting" of the frame takes place, contact is made and broken at least three times a second, which in a month of continuous operation amounts to about 7,800,000 contacts. The adjacent edges 40, 41 of the tungsten blocks are sharpened to form knife edges, the edges being substantially unaffected by the constant rolling back and forth of the softer gold trolley and the constant making and breaking of electric contact. Obviously, other metals of like properties to gold may be used for the trolley, if desired, such as silver or copper; both of which are good conductors and comparatively soft, but gold, platinum, and platinum iridium, possess the superiority of not tarnishing and keeping their surface smooth and bright, even though sparking occurs at the surface thereof. A further aid to the wearing quality of these contacts is the fact that during the continuous oscillations of the follow-up support carrying the contact blocks, the trolley slowly revolves on pivots 18, 19, thus presenting continually a new wearing face. The cause of this rotation or "creeping" has been found to be an unfailing accompaniment of the hunting action of the compass. It is due mainly to the fact that more pressure is exerted on the trolley wheel in one direction than in the other, due to the fact that pivots 21, 22, are to one side of pins 18, 19 and to the action of spring 24. As shown in Fig. 3, in one direction the trolley is subjected to a wedging action because when the contact-blocks are being pushed downwardly in Fig. 3, the moving force has a component forcing the trolley against the face of blocks 33, 34, thus increasing the pressure on the roller. On the return stroke the moving force has a component in the opposite direction, thus lessening the pressure exerted by spring 24. The result is that there is more tendency to slip in one direction than in the other, resulting in the creeping effect above described. The block supporting the contacts is detachably held in place by means of a thumb nut 42 which presses contact springs 43, 44, secured to the contacts 40, 41, respectively, into firm engagement with contacts 45, 46, on bracket 47. Pins 48, 49, 50 on said bracket provide a three point support for the block. A portion or all of said pins are provided with smaller guide pins 51, 52, taking in apertures 53, 54 in said block for positioning the same.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is, 1. An electrical contact wheel composed of an aluminum hub and web, the former having a German silver bearing block and a bracket supporting the wheel having Monel metal bearing pins thereon for the wheel.

2. In combination, a make-and-break device for a pair of elements, said device comprising a pivotally mounted contact block on one of said elements, a spring pressed roller on the other of said elements adapted to roll on and off said block to make and break a contact, and means whereby said roller is subjected to greater pressure when said block is moved in one direction than in the other direction whereby a new contact face is continually presented due to the creeping action of the roller.

3. In a gyro compass having a sensitive element and an electrical follow-up element, an electrical contact wheel mounted on one of said elements composed of an aluminum hub and web, the former having a German silver bearing block and a bracket supporting the wheel having Monel metal bearing pins thereon for the wheel.

4. In gyroscopic compass having a sensitive element and a follow-up element, a contact unit for such elements comprising a contact block on one of said elements, a spring pressed roller on the other of said elements adapted to roll on and off said block to make the break a contact, a pivoted bracket on which said roller is journalled, the pivot of said bracket being located further from said contact block than the roller journals whereby a wedging action is secured and whereby a new contact face is continually presented due to the creeping action of the roller.

5. A make and break device comprising a plurality of spaced contacts, a contact roller, a pivotally mounted arm for supporting said roller, said pivot being so positioned relative to said contacts to form a wedge for said roller, means whereby relative movement between said contacts and said roller tends to move said roller into said wedge on one stroke and out of said wedge on the opposite stroke, whereby greater pressure is exerted between said roller and contacts in one direction than in the opposite direction.

In testimony whereof I have affixed my signature.

CHESTER B. MILLS.